Oct. 2, 1928.
F. H. OWENS
1,686,462
PHOTOGRAPHIC FILM AND MAGAZINE THEREFOR
Filed Aug. 25, 1926
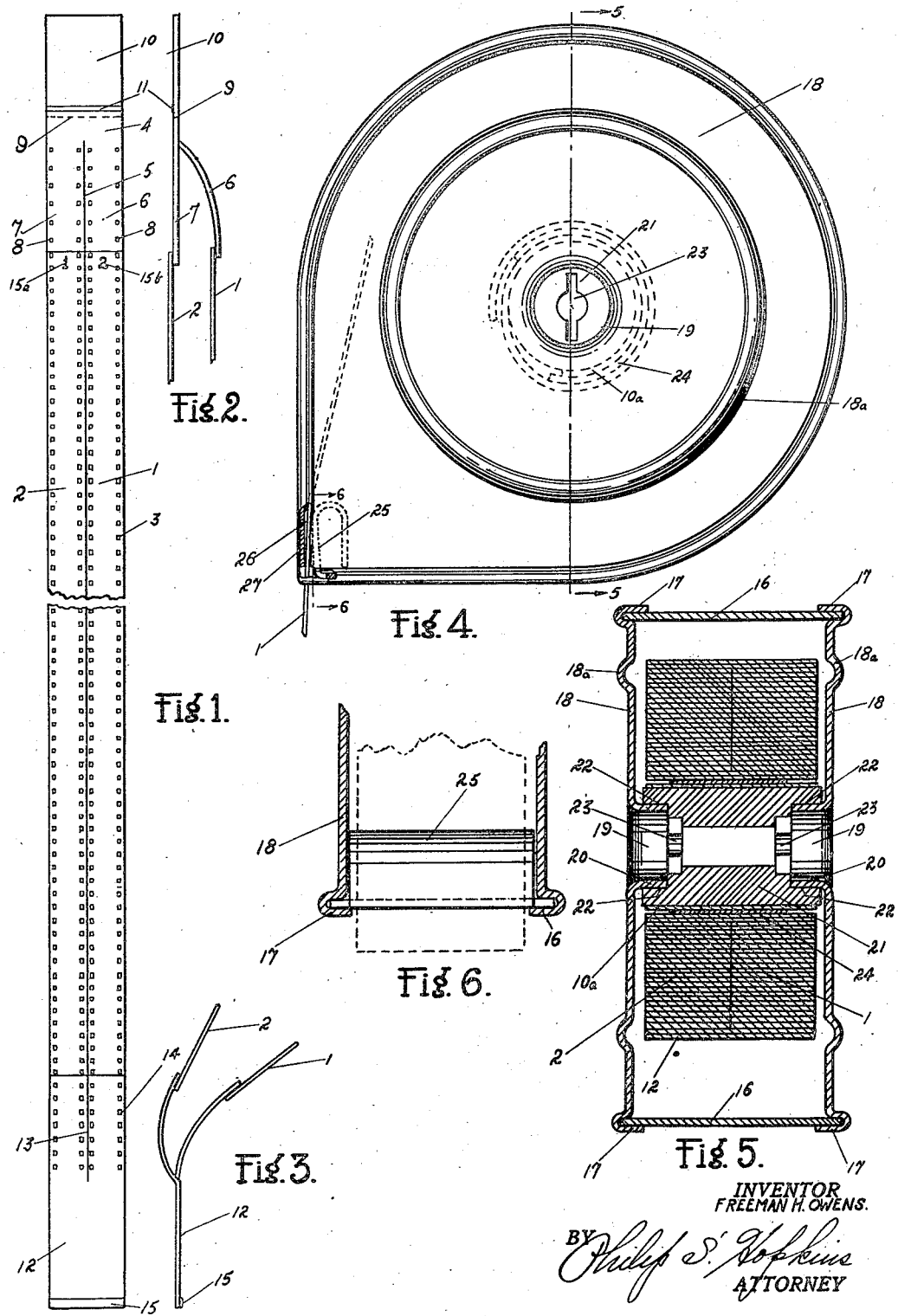
INVENTOR
FREEMAN H. OWENS.
BY Philip S. Hopkins
ATTORNEY Patented Oct. 2, 1928.

1,686,462

UNITED STATES PATENT OFFICE.

FREEMAN H. OWENS, OF NEW YORK, N. Y.

PHOTOGRAPHIC FILM AND MAGAZINE THEREFOR.

Application filed August 25, 1926. Serial No. 131,393.

My invention has for its primary object the provision of a photographic film cartridge comprising a double strip of film with a common leader strip at either end.

A second object is to provide such cartridge with a leader strip which is split centrally for a portion of its length and having its split portions perforated and aligned with the perforations on the strips of film to which it is secured.

A still further object is to provide these leader strips with a removable portion provided with means for securing the same to either end of the double strip.

Another object is to provide a novel form of magazine or holder, and film spool for the double strip film cartridge, which is simple in construction, economic in manufacture, of few parts, readily assembled and light tight.

Still another object is to provide novel indicating means at the ends of the film strips whereby to facilitate the alignment and "framing" thereof.

Other objects and advantages in details of construction will be apparent as the description proceeds reference being had to the accompanying drawing wherein like reference numerals indicate like parts.

In the drawing:—

Figure 1 is a plan view of the double film strip with the leader strips shown attached at its ends.

Figure 2 is a side view showing the leader strip secured to one end of the film.

Figure 3 is a detail side view showing the leader strip secured to the other end of the film.

Figure 4 is a side view of my improved magazine.

Figure 5 is a cross sectional view of the magazine taken on line 5—5 of Figure 4.

Figure 6 is a detail view of a portion of the magazine.

My film cartridge comprises the two strips, 1 and 2 of photographic film, preferably moving picture film, perforated adjacent its edges in the usual manner as at 3, and of any desired length. At one end of this double strip of film, I attach as by glue or other suitable means a leader strip 4 split centrally and longitudinally as at 5 for a portion of its length thus providing individual leader strips 6 and 7 for each length of the double film. The portions 6 and 7 of the leader strip are perforated as at 8 in alignment with the perforations 3 on the film. It will be understood that the perforations of both the film and leader strips are spaced a distance equal to the exposure areas or image frames. The leader strip 4 is scored across its width as at 9 at a point substantially above the split portions 6 and 7 whereby the strip may be readily torn or cut in two. The extreme end 10 of the strip is provided directly adjacent the scored portion 9 with an adhesive or other form of securing means 11, for a purpose to be described.

At the opposite end of the double strip of film is a second leader strip 12 also split centrally and longitudinally for a portion of its length, as at 13 and perforated in alignment with the perforations 3 as at 14. The extreme end of this leader strip 12 is also provided with adhesive or other securing means 15.

One or both ends of the film strips as desired, may be provided with indicating marks 15ª and 15ᵇ, located in opposite exposure areas or image frames between the perforations 3, whereby to facilitate matching or framing the two strips before and after exposure.

In using this film cartridge, it will be understood that the end portion 10 of the leader strip 4 is first secured to a spool or reel upon which the rest of the double strip is then wound leaving the end of the leader strip 12 on the outside of the reel. The reel is then placed in the camera designed for this purpose. It will be understood that the camera also contains a take up spool and magazine provided with a leader strip 10 ready to be attached to the leader strip 12 of the supply magazine just placed in the camera. The gummed portion 11 of this short leader strip 10 extending from the empty or take up reel in the camera is then attached to the gummed portion 15 on the leader strip 12 and the double strip threaded through the camera to picture taking position. After the double strip of film has been wound through the camera in the usual manner, driven by the well known sprockets engaging in the perforations 3, and the end of the strip is reached, it will be clear that the portions 6 and 7 of the leader strip 4, preferably an opaque paper or other light protective material, will be wound around the exposed film several turns as may be necessary. At this point there being no further perforations in the leader strip 4, the winding action will of course stop whereupon the camera may be opened and the leader strip 4 torn from the portion 10 at the point 9. This exposed roll is then ready for development. The empty reel with the stub 10 projecting therefrom is now ready for insertion in the position of the take up reel in the camera and to the gummed portion 11 may be secured the leader strip 12 of a new reel for a repetition of the operations just described.

This type of film cartridge comprising the double strip film with the split and perforated common leader strip has many uses and is particularly adapted for moving picture cameras wherein successive pictures are taken on alternate strips of film whereby one view merely dissolves into another, thus eliminating the "flicker" caused by the intermittent opening and closing of the shutter between each exposure on a single strip of film. It will be understood, however, that this photographic film cartridge is also adaptable for use in stereoscopic cameras either of the "still" or "movie" type. Its advantages extend equally also to the use in cameras and projectors designed especially for color work.

It will also be understood that the term "photographic film" as used in this description and the claims attached hereto, applies to either negative or positive film coated in the usual manner with a light sensitive emulsion, and to developed film with visible images thereon for printing or projecting. The term "cartridge" is intended to refer to the film, the spool or support upon which it is wound, the magazine, or to any combination thereof. It is a general descriptive term and not limited to any particular feature of this article of manufacture.

A magazine for a film cartridge of the type just described is illustrated in Figures 4, 5 and 6 and comprises a flat piece 16 bent into substantially circular form and receiving at its edges the flanges 17 of side pieces 18 forming the walls of the magazine. The flanges 17 are as shown slightly channeled in order to frictionally embrace the edges of the member 16 on either side, whereby the walls are securely held in position.

The walls 18 are provided with the reinforcing or strengthening ribs 18ª preferably formed integral therewith, also perforated centrally as at 19, and the material around the perforations drawn inwardly as at 20 to provide bearings for a spool 21 having the shoulders 22 riding rotatably on the bearings 20. The spool 21 is provided with a squared recess 23 in alignment with the openings 19 to receive a crank or other device for rotating the spool.

In Figure 5, I have shown a roll of the double strip film wound upon the spool 23, although it will be understood that the magazine is equally adaptable for film rolls of the single strip type. In this instance, one convolution 10ª of the leader strip 10 is shown wound about the spool 21 and secured thereto by means of a clip 24 or other suitable securing means. The leader strip 12 is shown protecting the outer convolutions of the film.

Referring now to Figures 4 and 6, it will be observed that the substantially circular wall 16 of the housing has its ends brought closely adjacent to one another and the end 25 is shown bent upwardly and then back upon itself to form a resilient guide for the film as it is wound from the spool out of the magazine. A narrow space 26 is provided between the end 25 and the opposite end 27 of the member 16 through which the film strip may pass.

Obviously many changes in details of construction and operation will be apparent to those skilled in the art without departing from the spirit and scope of the invention. I do not limit myself therefore to the exact form shown and described herein other than by the appended claims.

I claim:—

1. A photographic film cartridge comprising a double strip of film wound upon a single support.

2. A photographic film cartridge comprising separate strips of film wound edge to edge upon a single support.

3. A photographic film cartridge comprising separate strips of film provided with a common leader strip.

4. A photographic film cartridge comprising separate strips of film placed edge to edge, common leader strips at each end of said film strips, said leader strips being split for a portion of their lengths in alignment with the abutting edges of said film strips.

5. A photographic film cartridge comprising separate strips of film, each strip being perforated along its edges, a common leader strip attached to the end of said film strips, said leader strip being split longitudinally for a portion of its length and having perforations in such split portions in alignment with said film perforations.

6. A photographic film cartridge comprising a length of film having a leader strip secured to one end thereof, said leader strip being scored across its body portion a substantial distance from the film.

7. A photographic film cartridge comprising a length of film having a leader strip secured to one end thereof, said leader strip being scored across its body portion a substantial distance from the film, and provided with an adhesive adjacent said scoring.

8. A photographic film cartridge comprising separate strips of film, each strip being perforated along its edges, common leader strips secured to each end of said film strips, said leader strips being split longitudinally for a portion of their lengths and having perforations in such split portions in alignment with said film perforations, said leader strips being scored across their body portions at points beyond said split portions and provided with an adhesive adjacent said scorings.

9. A photographic film cartridge comprising a spool, separate strips of film having common leader strips at their ends, wound upon said spool, and means for securing one of said leader strips to said spool.

10. A photographic film cartridge comprising a spool, a magazine enclosing said spool, separate strips of film wound upon said spool edge to edge, the side walls of said magazine forming guides for the outer edges of said film strips.

11. A photographic film cartridge comprising separate strips of film placed edge to edge and provided at the ends with common leader strips, and indicating means at the ends of said film strips.

12. A photographic film cartridge comprising separate strips of film perforated at the edges, placed edge to edge and provided with a common leader strip, said perforations being spaced on each strip the distance of one image frame, and indicating means on the ends of said strips in opposite frames.

13. A photographic film cartridge comprising separate film strips placed edge to edge each of said strips being provided with perforations spaced apart a distance equal to an exposure area or image frame, and indicating means at the end of each strip located in oppositely alined frames.

14. A photographic film cartridge comprising a double strip of film wound edge to edge upon a single support, and a light tight magazine enclosing the same.

15. A photographic film cartridge comprising a double strip of film wound edge to edge upon a single support and provided with a common leader strip, a light tight magazine enclosing the same and provided with an outlet for said leader strip and film.

FREEMAN H. OWENS.